United States Patent [19]

Martz

[11] Patent Number: 4,479,625
[45] Date of Patent: Oct. 30, 1984

[54] CONDUIT HANGER

[75] Inventor: Raymond L. Martz, Palatine, Ill.

[73] Assignee: Minerallac Electric Company, Chicago, Ill.

[21] Appl. No.: 550,056

[22] Filed: Nov. 8, 1983

Related U.S. Application Data

[63] Continuation of Ser. No. 244,223, Mar. 16, 1981, abandoned.

[51] Int. Cl.³ .............................................. F16L 3/08
[52] U.S. Cl. ..................................... 248/74.1; 248/62
[58] Field of Search ...................... 248/74 R, 73, 67.7, 248/71, 72, 62, 300

[56] References Cited

U.S. PATENT DOCUMENTS

| | | | |
|---|---|---|---|
| 1,160,047 | 11/1915 | Conner .................................. | 248/71 |
| 1,963,908 | 6/1934 | Manasek ........................... | 248/74 R |
| 2,375,513 | 5/1945 | Bach ................................. | 248/72 X |
| 2,924,639 | 2/1960 | Zelt ................................... | 248/300 X |
| 3,185,418 | 5/1965 | Appleton .......................... | 248/74 R |
| 3,292,888 | 12/1966 | Fischer .............................. | 248/72 |
| 3,298,646 | 1/1967 | Van Buren ........................ | 248/72 |
| 3,526,381 | 4/1968 | Pepe ................................. | 248/74 R |
| 4,039,131 | 8/1977 | Perrault et al. ..................... | 248/73 |

Primary Examiner—William H. Schultz
Assistant Examiner—Ramon O. Ramirez
Attorney, Agent, or Firm—Lockwood, Alex, Fitzgibbon & Cummings

[57] ABSTRACT

A generally U-shaped conduit hanger is disclosed which is resistant to bending under the weight of conduit and provides for simplified conduit installation. The U-shaped hanger has a center portion for attachment to a support member and a pair of spaced depending legs for securing conduit and the like therebetween. The center portion has a pair of flat lateral edge surfaces which lie in a plane spaced from that of the surface therebetween, serving to rigidify the center portion against bending in the transverse direction. Apertures may also be provided in the terminal ends of the legs for receiving a clamping bolt or screw, preferably with one of the apertures having a thread formation therearound to threadedly receive said bolt or screw, and eliminating the need for a retaining nut.

7 Claims, 10 Drawing Figures

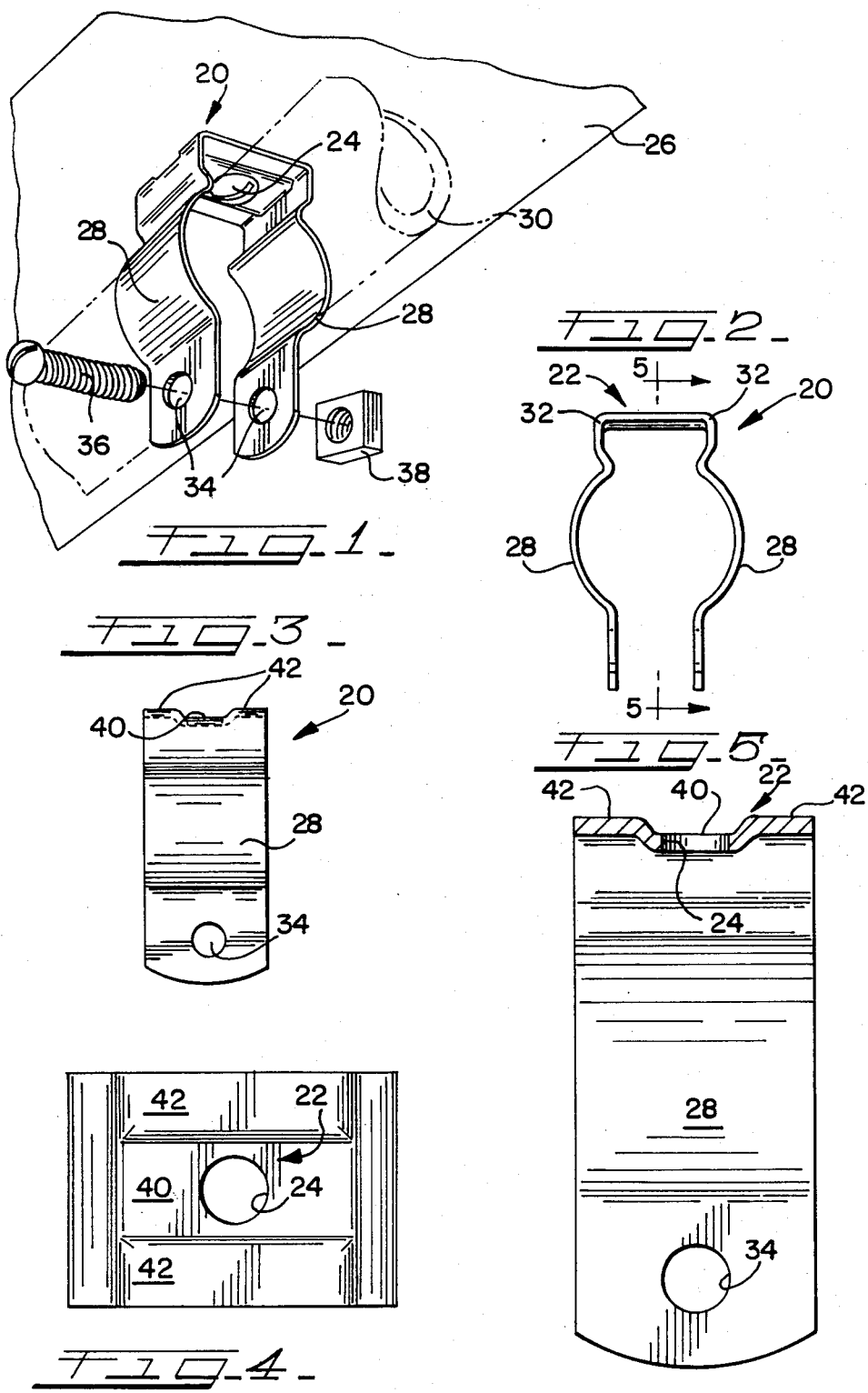

CONDUIT HANGER

This application is a continuation of application Ser. No. 244,223, filed Mar. 16, 1981 abandoned.

The present invention relates, in general, to hangers for conduit and the like, and more particularly, to improved hangers which are resistant to bending from the weight of the conduit and which make conduit installation easier and more efficient.

Hangers for conduit and similar items, such as water or gas pipe, come in a wide variety of shapes and sizes, depending on the particular requirements of each installation. One very common type of hanger is a generally U-shaped metal strip, bent at right angles in two places to provide a flat center portion which typically has a hole for attachment to a structural member, e.g., a floor joist or wall stud, and with the end portions of the metal strip forming a pair of depending legs between which the conduit or similar member is clamped. Typically, the ends of the legs are drilled or punched to receive a bolt for drawing the legs together to clamp the conduit securely therebetween.

Although hangers of the type described above are relatively inexpensive to fabricate and install, there are certain shortcomings. For example, heavy conduit, or conduit which is subject to lateral forces, may cause the hanger to bend around the head of the bolt or fastener which extends through the center portion of the hanger and attaches the hanger to the support member. This "drooping" effect is not only unsightly, but permits the conduit to hang out of the preferred location and may also result in weakening of the hanger.

A further shortcoming of present hangers of this type is that when installing conduit, the conduit often must be held between the spaced legs while a bolt is inserted through the end apertures in the legs and secured with a nut. In such a situation, this operation either requires an additional helper for the conduit installer or requires separate bracing of the conduit to hold it between the legs, while the bolt and nut are secured to maintain the conduit in place.

Accordingly, it is the general object of the present invention to provide a conduit hanger which does not have the shortcomings described above.

It is a more specific object of the present invention to provide a conduit hanger which is resistant to bending or sagging under the weight of the conduit.

A further object of the present invention is to provide a conduit hanger which makes conduit installation easier and more efficient, and does not require additional workmen or bracing of the conduit while it is being secured in the hanger.

These and other objects are achieved in accordance with the present invention, wherein a generally U-shaped conduit hanger is provided which is resistant to bending or drooping under the weight of the conduit by reason of the center portion presenting a multi-level cross-section with generally flat, center surface area extending between the depending leg edges and flanked by a pair of substantially flat lateral surface areas which lie in a plane spaced apart from that of the center surface area. This construction serves to rigidify the center portion against bending in the direction transverse to the conduit, thereby preventing "drooping" under the weight of conduit. In addition, the installation of conduit may be made easier and more efficient by impressing a thread configuration in one of apertures in the terminal portion of the legs. This permits the leg itself to threadedly receive the clamping screw, eliminating the need for a retaining nut and thus permitting the workmen to hold the conduit in place between the legs with one hand and to insert the screw with his other hand, greatly simplifying installation of the conduit.

The preferred and alternative embodiments of the present invention are set forth for the purposes of illustration and not limitation in the attached drawings, of which:

FIG. 1 is a perspective view of a clamp embodying the present invention, as it may be used to hang a cylindrically shaped conduit member from a support structure.

FIG. 2 is an end elevational view of the hanger of FIG. 1 embodying the present invention.

FIG. 3 is a side elevational view of the hanger of FIG. 1.

FIG. 4 is a top plan view of the hanger of FIG. 1.

FIG. 5 is a vertical sectional view taken along line 5—5 of FIG. 2.

Figure 6:
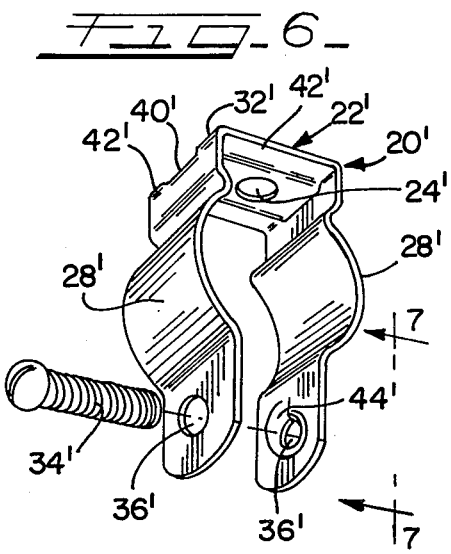
FIG. 6 is a perspective view of a hanger embodying the present invention, including aspects permitting more efficient and easier installation of conduit.

Turning now to a more detailed description of the illustrated embodiments of the present invention, beginning with FIGS. 1–5, the present invention is generally embodied in a hanger 20 of the type which is U-shaped, having a center portion 22 for attachment, via opening or aperture 24, to a structural element 26, such as a beam, joist or stud, and a pair of facing, spaced apart legs 28 which extend from opposite ends of the center portion for securing conduit 30 or the like, e.g., water or gas pipe therebetween.

The hanger 20 is preferably made of a strip of steel, although other materials of sufficient strength to carry the conduit may also be suitable. Each end portion of the strip is bent 90° along one of a pair of spaced bend lines 32, thus providing the generally U-shaped configuration of the hanger, with the center portion 22 being between the bend lines, and the end portions of the strip forming the spaced legs 28. Referring particularly to FIGS. 1 and 2, it may be seen that each leg 28 has an intermediate concavely bent portion to receive the cylindrically shaped conduit 30, and a straight terminal end portion with an aperture 34 to receive the clamping bolt 36 and retaining nut 38.

To prevent bending of the center portion 22 under the weight of the conduit 30, as may best be seen in FIG. 5, the center portion 22 has a depressed center surface area 40, which is slightly wider than the aperture 24, and lies in a plane below that of the flanking lateral edge surfaces 42. Each of these surface areas is substantially flat and extends longitudinally between the transverse bend lines 32, serving to rigidify the center portion and making it resistant to bending or "drooping" in the transverse direction.

Figure 7:
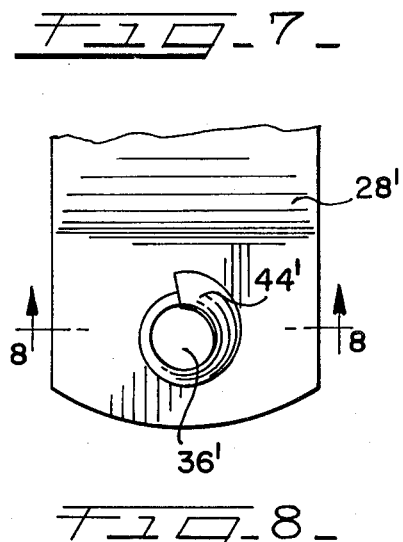
FIG. 7 is an enlarged partial view taken along line 7—7 of FIG. 6, and depicting the thread impression in one leg of the conduit hanger for threadedly receiving a threaded bolt or screw.
Figure 8:
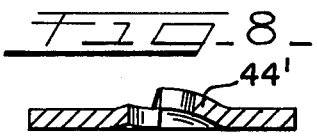
FIG. 8 is a horizontal sectional view taken along line 8—8 of FIG. 7.

FIGS. 6–8 illustrate further aspects of the present invention which simplify installation of conduit. Elements of the hanger shown in FIGS. 6–8 which are the same as those of FIGS. 1–5 are identified by like prime numbers. As with the hanger of FIGS. 1–5, the hanger 20' of FIG. 6 is a U-shaped metal strip, bent at transverse bend lines 32' to define a center portion 22' and depending legs 28'. The center portion has a center aperture 24', with a pair of raised flat lateral edge surfaces 42' flanking a flat depressed center surface area 40' to resist bending under the weight of conduit. To eliminate the need for a retaining nut, and provide for easier conduit installation, however, one of apertures 36' in the terminal end portions of legs 28' is made of slightly smaller diameter than the other aperture and is impressed with a thread 44' to threadedly receive the bolt or screw 34'. The thread impression is made by stamping or pressing the marginal edge of the selected aperture into a single spiral, which matches the threads of the screw of bolt 34'. With this construction, the bolt or screw 34' may be inserted through the unthreaded aperture and into the threaded aperture with one hand, leaving the other hand free for holding the conduit or performing other functions.

Figure 9:
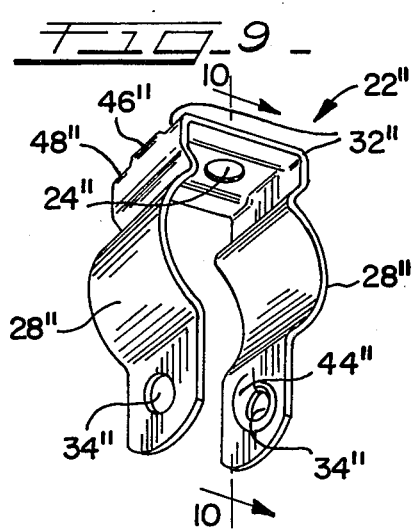
FIG. 9 is a perspective view of a hanger embodying an alternative construction of the present invention.
Figure 10:
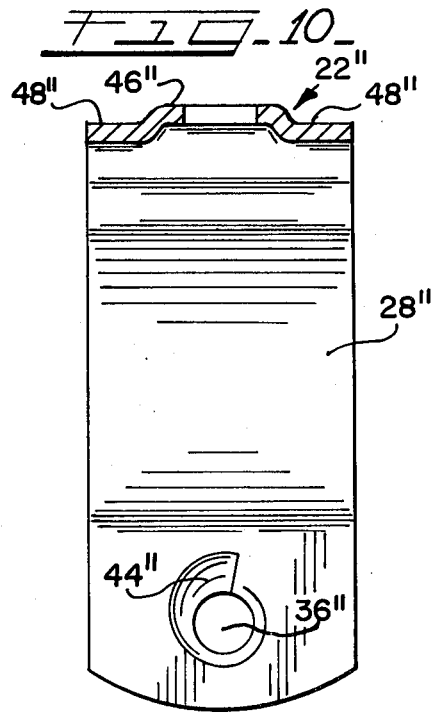
FIG. 10 is a vertical sectional view taken along line 10—10 of FIG. 9.

FIG. 9 depicts a further embodiment of the present invention, wherein the center portion 22' has a raised flat center surface area 46'' extending between bend lines 32'' and flanked by a pair of depressed flat lateral surface areas 48'', thereby providing resistance to lateral bending under heavy loads. Also, the embodiment as shown in FIGS. 9 and 10, one of the apertures 34'' in the terminal end portion of the legs 28'', is formed by a thread impression 44'' for receiving the bolt or screw (not shown) which clamps the legs 28'' together about the conduit.

Although the present invention has been depicted in its preferred and alternative embodiments, it is intended that the present application, as defined in the attached claims, include those equivalent structures, some of which may be immediately apparent and others of which may be apparent only after some study.

What is claimed is:

1. In a hanger of the type including a generally U-shaped support element having a bearing surface center portion with opening means for attachment to a support structure and the like and a pair of spaced legs having pipe receiving portions extending from opposite ends of said center portion for securing conduit and like members therebetween, the improvement comprising, in combination, said bearing surface center portion having a substantially flat first center surface area extending between said spaced legs and joined thereto, said opening means being centrally positioned with respect to said first center surface area, and a second center surface area integrally abutting said first center surface area, said second center surface area lying in a plane generally parallel to the plane of said first center surface area and spaced a distance therefrom, said second center surface area also extending between said spaced legs and joined thereto, said first and second center surface areas disposed transverse to the plane of said spaced legs whereby the distance differential between said first and second center surface area imparts an increased resistance to bending of said center portion about its lateral and transverse axes when conduit and like members are installed therein, and said depending legs having an aperture below each respective pipe receiving portion for receiving a fastener to secure conduit and the like between said legs, and one of said apertures having a thread impression to threadedly receive said fastener.

2. A hanger in accordance with claim 1 wherein said first center surface area is depressed below said lateral surface areas.

3. A hanger in accordance with claim 1 wherein said first surface is raised above said lateral surface areas.

4. In a hanger of unitary construction of the type including a generally U-shaped support element having a bearing surface center portion with opening means for attachment to a support structure and a pair of spaced apart legs having pipe receiving portions extending from opposite ends of said center portion for securing conduit and like members therebetween, the improvement comprising a bearing surface center portion having a multi-planar cross-section, said center portion having a substantially flat first center surface area extending between and connecting the spaced apart legs and through which said opening means extends, said first center surface area disposed transverse to the plane of said spaced apart legs, and two substantially flat second center surface areas abutting and joined to said first center surface area, said second surface areas also extending between and connecting said spaced apart legs, said second center surface areas also disposed transverse to the plane of said spaced apart legs said second center surface areas being disposed in a plane generally parallel to the plane of the first surface area, said second center surface areas spaced a distance away from said first surface area, whereby the difference in distance between said first and second center surface areas imparts an increased resistance to bending of said center portion about its lateral and transverse axes when conduit and like members are installed therein.

5. The conduit or the like hanger of claim 4 wherein the plane of said first center surface area is located below the plane of said second center surface areas.

6. The conduit or the like hanger of claim 4 wherein the plane of said first center surface area is located above the plane of said second center surface areas.

7. The conduit or the like hanger of claim 4 wherein each depending leg includes an aperture below each respective pipe receiving portion for receiving a fastener to secure conduit and the like between said legs, one said aperture having a thread impression to threadedly receive said fastener.

* * * * *